(12) United States Patent
Boggs et al.

(10) Patent No.: US 7,949,846 B2
(45) Date of Patent: May 24, 2011

(54) MAP SHUFFLE-ALLOCATION MAP PROTECTION WITHOUT EXTRA I/O'S USING MINIMAL EXTRA DISK SPACE

(75) Inventors: Gary L. Boggs, San Diego, CA (US); John Mark Morris, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 683 days.

(21) Appl. No.: 11/564,868

(22) Filed: Nov. 30, 2006

(65) Prior Publication Data

US 2008/0133863 A1 Jun. 5, 2008

(51) Int. Cl.
*G06F 12/02* (2006.01)
(52) U.S. Cl. .................. 711/170; 711/E12.002
(58) Field of Classification Search .................. None
See application file for complete search history.

(56) References Cited

U.S. PATENT DOCUMENTS

| | | | | |
|---|---|---|---|---|
| 6,185,663 B1* | 2/2001 | Burke | | 711/156 |
| 6,453,383 B1* | 9/2002 | Stoddard et al. | | 711/112 |
| 6,725,321 B1* | 4/2004 | Sinclair et al. | | 711/103 |
| 2006/0184720 A1* | 8/2006 | Sinclair et al. | | 711/103 |
| 2007/0143571 A1* | 6/2007 | Sinclair et al. | | 711/203 |

* cited by examiner

*Primary Examiner* — Matt Kim
*Assistant Examiner* — Ryan Dare
(74) *Attorney, Agent, or Firm* — James Stover (57) ABSTRACT

A method and system for allocating storage space on a storage device to a requesting entity. The storage device includes a set of extents. An allocation map is maintained in computer memory. The allocation map has a plurality of map blocks, the map blocks each having a plurality of map entries. The map entries include respective logical extent identifiers, physical extent information and obsolete indicators. An invalid extent logical identifier represents a free extent and a valid extent identifier represents a prior allocated extent. An obsolete indicator marks a map entry as either current or obsolete. In one technique an extent allocation request is received from the requesting entity. A first map block is selected having a first map entry marked as obsolete. A second map block is selected having a second map entry not marked as obsolete. Physical extent information is copied from the second map entry to the first map entry. The logical extent identifier is assigned to the first map entry. The first map entry is marked as current and the second map entry is marked as obsolete. The storage allocation system includes a disk storage device having a set of extents. A requesting entity is configured to request allocation of one of the extents. An allocation map is maintained in computer memory. An allocator is configured to allocate one of the extents on the disk device to the requesting entity.

17 Claims, 9 Drawing Sheets

MAP SHUFFLE-ALLOCATION MAP PROTECTION WITHOUT EXTRA I/O'S USING MINIMAL EXTRA DISK SPACE

BACKGROUND

Data organization is important in any database that deals with complex queries against large volumes of data. Disks or other storage devices on which the data is stored are generally divided into a set of "extents". In a database system that includes a plurality of processing modules, individual processing modules have temporary control over one or more of the extents. Each extent is either temporarily owned by a processing module, or is free waiting to be allocated to a requesting processing module.

An allocation map controls the association of extents to processing module owners. The map is managed by a software process known as an allocator. When an extent is allocated, the allocator assigns a logical identifier to the extent and associates the logical identifier and the current owner with the extent by updating the allocation map. Usually an in memory copy of the map is kept and an on disk version of the map is only used for recovery. However, when an assignment or allocation occurs or an extent becomes free, the map entry must be written to disk before a confirmation is sent to the requesting processing module.

There can be problems where an interrupted write occurs. The allocator must ensure that the allocation map is valid even when problems such as interrupted writes caused by processing module or storage device failure occur.

Prior solutions to this interrupted write problem mostly involve keeping separate copies of the data. One solution is to write to alternating destinations. Another solution is to create a temporary duplicate copy of the data. In these cases the alternate data can be used to preserve an image of the data prior to the interrupted write problem. Such prior solutions generally require extra I/O operations to the allocation map and/or large amounts of space for duplicate entries.

SUMMARY

Described below is a method of allocating storage space on a storage device to a requesting entity. The storage device includes a set of extents. The system includes an allocation map. The allocation map has a plurality of map blocks, the map blocks each having a plurality of map entries. The map entries include respective logical extent identifiers, physical extent information and obsolete indicators. An invalid extent logical identifier represents a free extent and a valid extent identifier represents a prior allocated extent. An obsolete indicator marks a map entry as either current or obsolete.

In one technique an extent allocation request is received from the requesting entity. A first map block is selected having a first map entry marked as obsolete. A second map block is selected having a second map entry not marked as obsolete. Physical extent information is copied from the second map entry to the first map entry. The logical extent identifier is assigned to the first map entry. The first map entry is marked as current and the second map entry is marked as obsolete.

The technique optionally includes the further steps of identifying a further map entry marked as obsolete in the first map block and selecting a further map block having a further map entry not marked as obsolete. The physical extent information is copied from the further map entry in the further map block to the further map entry in the first map block. The logical extent indicator is copied from the further map entry in the further map block to the further map entry in the first map block. The further map entry in the first map block is marked as current and the further map entry in the further map block is marked as obsolete.

Also described below is a storage allocation system. The storage allocation system includes a disk storage device having a set of extents. A requesting entity is configured to request allocation of one of the extents. An allocation map is maintained in computer memory. An allocator is configured to allocate one of the extents on the disk device to the requesting entity.

DETAILED DESCRIPTION

Figure 1:
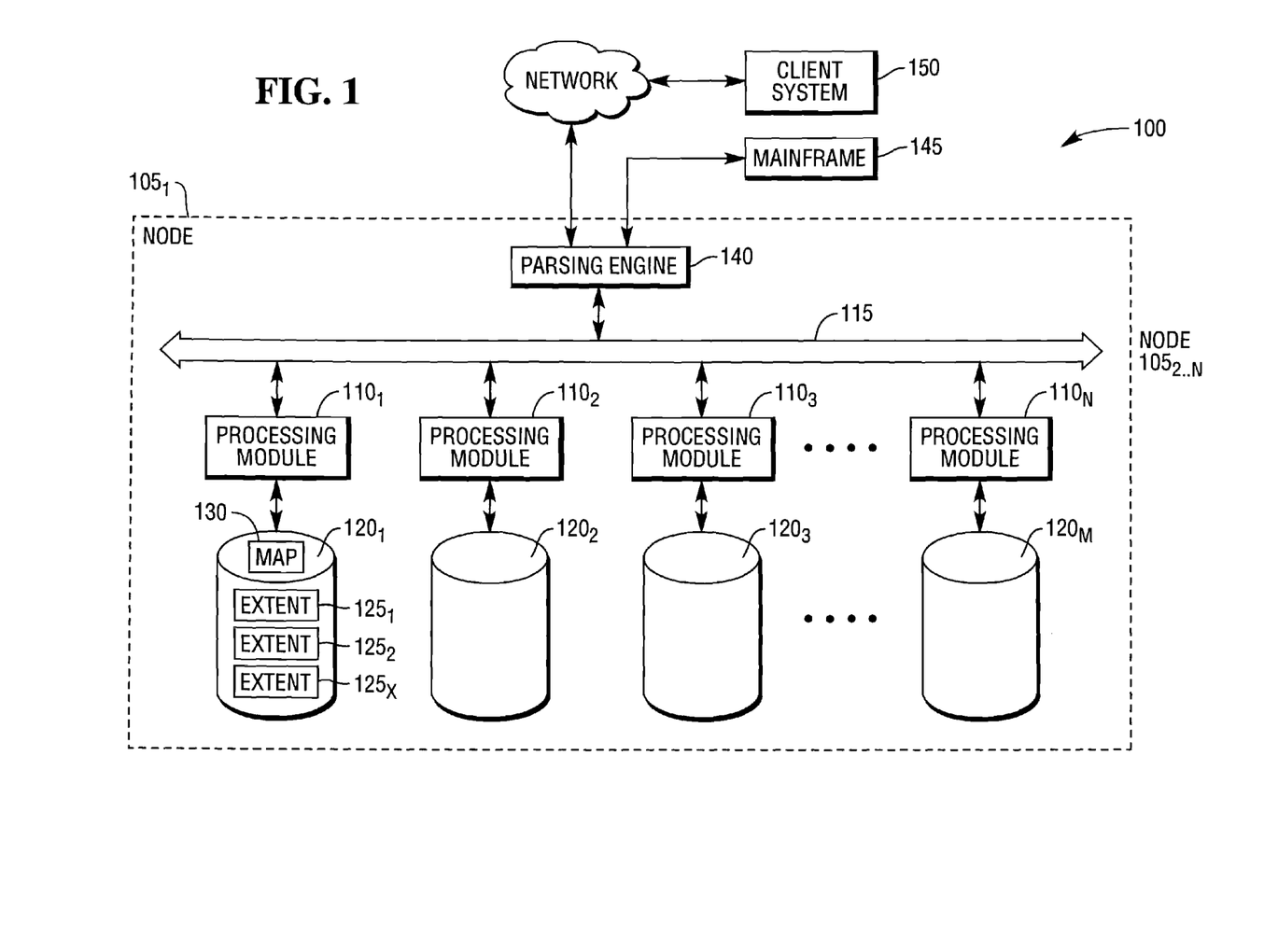
FIG. 1 is a block diagram of a node of a database system that includes processing modules.

The storage allocation techniques described in this specification have particular application but are not limited to large databases such as that shown in FIG. 1. These databases contain many millions or billions of records managed by a database system (DBS) 100, such as a Teradata active data warehousing system available from NCR Corporation. FIG. 1 shows a sample architecture for one node $105_1$ of the DBS 100. The DBS node $105_1$ includes one or more processing modules $110_{1 \ldots N}$ connected by a network 115. The DBS may include multiple nodes $105_{2 \ldots N}$ in addition to the illustrated node $105_1$, connecting by extending the network 115.

The processing modules manage the storage and retrieval of data stored in data storage facilities $120_{1 \ldots M}$. Each of the processing modules in one form comprise one or more physical processors. In another form they comprise one or more virtual processors with one or more virtual processes running on one or more physical processors.

Each of the processing modules $110_{1 \ldots N}$ manages a portion of a database that is stored in corresponding data storage facilities $120_{1 \ldots M}$. Each of the data storage facilities $120_{1 \ldots M}$ includes one or more disk drives. The storage facilities are divided into a set of extents. Storage facility $120_1$ includes for example data extents $125_{1 \ldots X}$. Individual extents are owned by a requesting entity for the purpose of performing an input/output operation. Once a requesting entity has finished with the extent, the extent is released to be requested by another requesting entity. In the system shown in FIG. 1 processing modules 110 are examples of requesting entities. Processing module $110_1$ for example requests or temporarily owns one or more extents $125_{1 \ldots X}$.

Individual extents are either owned by a requesting entity, or are free and available to be allocated to a requesting entity.

System 100 includes an allocation map 130 that is stored both on disk on one of the storage devices and in computer memory. The allocation map 130 controls the association of extents with requesting entities or owners. The map is managed by a software process called an allocator (not shown). The allocation map and operation of the allocation map will be further described below.

A parsing engine 140 in system 100 organizes the storage of data and the distribution of table rows among data extents within the processing modules $110_{1...N}$. The parsing engine 140 also coordinates the retrieval of data from the data storage facilities $120_{1...M}$ in response to queries received from a user at a mainframe 145 or a client computer 150. The DBS 100 usually receives queries and commands to build tables in a standard format such as SQL.

Figure 2:
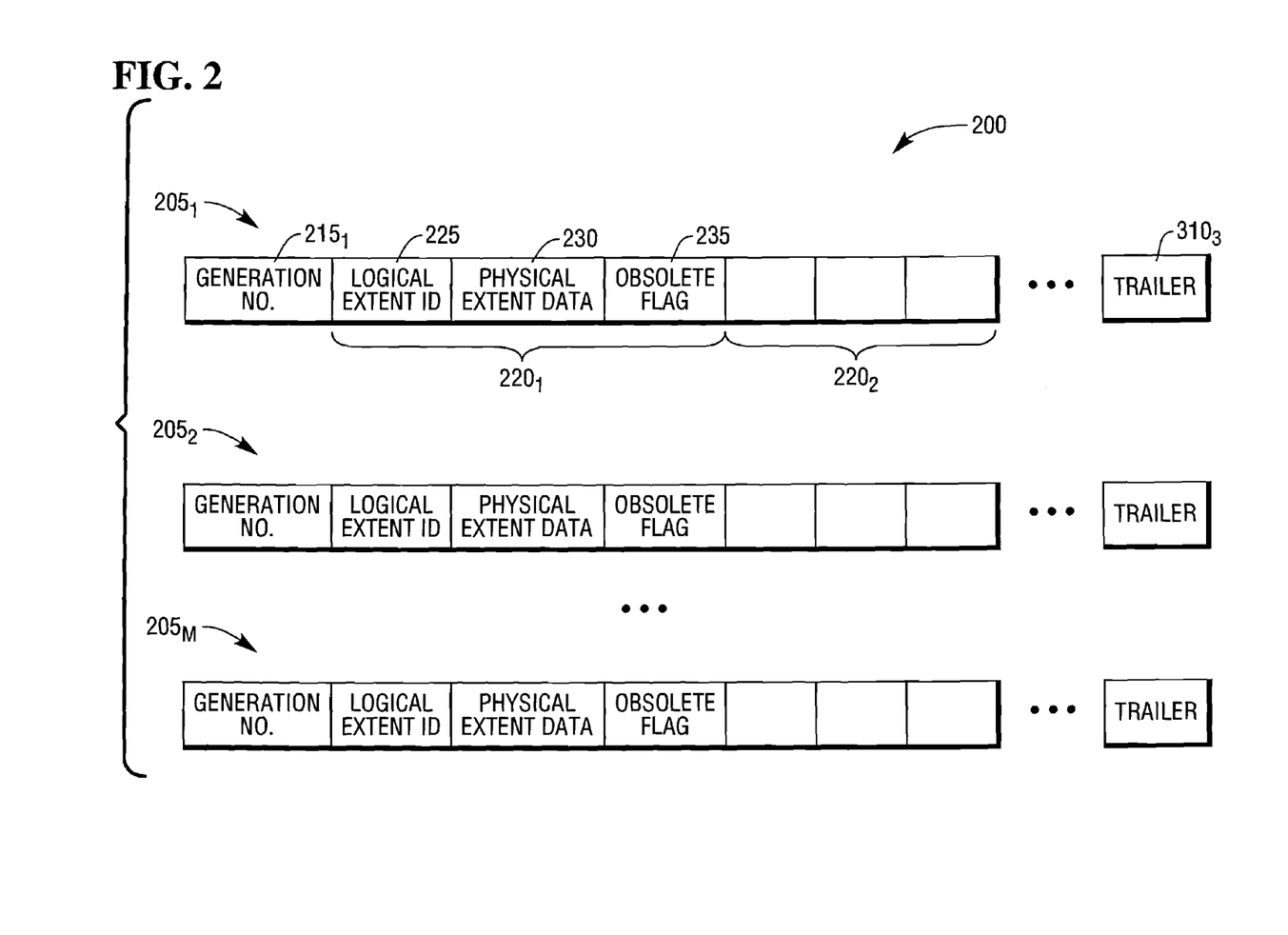
FIG. 2 is an example of an allocation map that is stored on disk.

FIG. 2 illustrates one example of an allocation map 200 that is stored on disk. The allocation map 200 includes a plurality of map blocks $205_{1...M}$ each containing map entries 220. The map blocks 205 are identified by their respective offsets within allocation map 200. Within allocation map 200 can be stored multiple versions of individual map entries. There could be stored within the allocation map one current version of a map block and one or more obsolete versions.

It is preferable to include within each map block 205 a generation number $215_{1...M}$. The generation number in one form is a 64 bit integer. The generation number can be used to compare versions of map entries within the allocation map. In one configuration where two versions of a map entry are located within the allocation map, the entry in the map block with the lower generation number is deemed obsolete.

Within the allocation map 200 individual map blocks each include a plurality of map entries. Each map entry represents a data extent within a storage facility. Map block $205_1$ for example, includes map entry $220_1$ and map entry $220_2$. It is envisaged that there are sufficient map entries within each map block to represent all of the extents managed by the allocator. It is also envisaged that there are a few additional map entries as will be described below.

Each entry, such as map entry $220_1$, in turn includes a logical extent identifier shown as a logical extent identifier 225, physical extent data 230 and status flags 235.

Logical extent identifier 225 is typically a 64 bit integer. Valid logical extent identifiers indicate that the extent associated with that map entry has been prior allocated to a requesting entity. Where a logical extent identifier has a null value, this indicates that the associated extent is free and able to be allocated to a requesting entity.

The physical extent data 230 includes a physical extent number. Physical extent data 230 details the nature of the extent and where it is stored on disk. This differs from the logical extent identifier by which a requester references the map entry.

One of the status flags 235 is an obsolete flag indicating whether or not a map entry is either current or obsolete. If a flag associated with a map entry is set to true, then this indicates the map entry is obsolete. There is another map entry in the allocation map 200 on disk and in memory as will be described below that contains newer information for the physical extent associated with the obsolete map entry. The status flags in one form are of type Boolean having a value of true or false.

It is envisaged that each map block includes trailer $240_{1...M}$. The trailer includes a check sum for the map block and other information.

Figure 3:
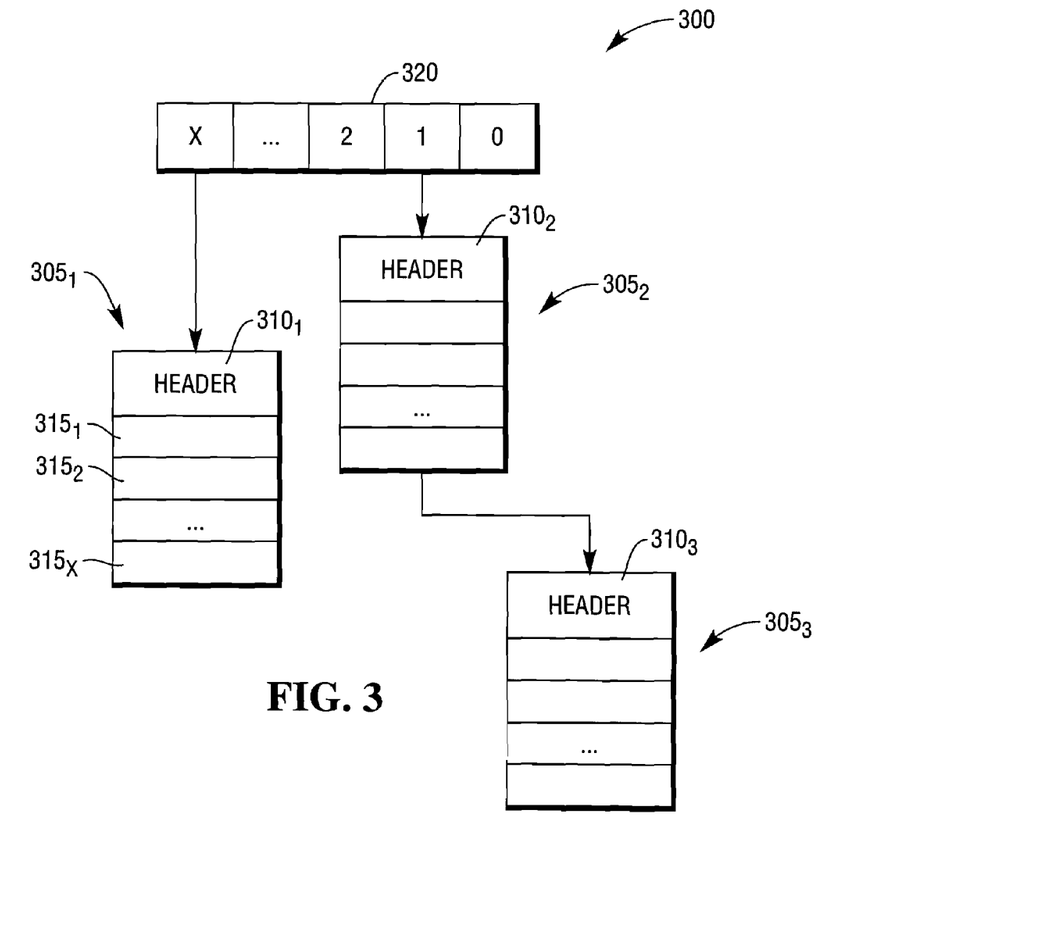
FIG. 3 is an example of an allocation map that is stored in memory.

FIG. 3 illustrates an example of an allocation map 300 that is stored in memory. Map blocks $305_1$, $305_2$ and $305_3$ are shown. For the purposes of illustration, each map block 305 includes a plurality of map entries. As shown in FIG. 3 each map block includes a header 310 and X map entries. Map block $305_1$ for example includes map entries $315_{1...X}$.

Map entries 305 are maintained in an ordered list 320 for example a skip list. In one embodiment the map entries are ordered within the allocation map 300 by the number of obsolete map entries. Where there are X number of map entries in each map block, map entries in which all X map entries are marked as obsolete are closer to the head of the list.

Map block $305_1$ is at the head of the list as all map entries are marked obsolete. Map blocks that have a lower number of obsolete map entries are closer to the tail of the list. In FIG. 3 map blocks $305_2$ and $305_3$ have only one obsolete entry each so these map blocks are closer to the tail of the list than map block $305_1$.

Figure 4A:
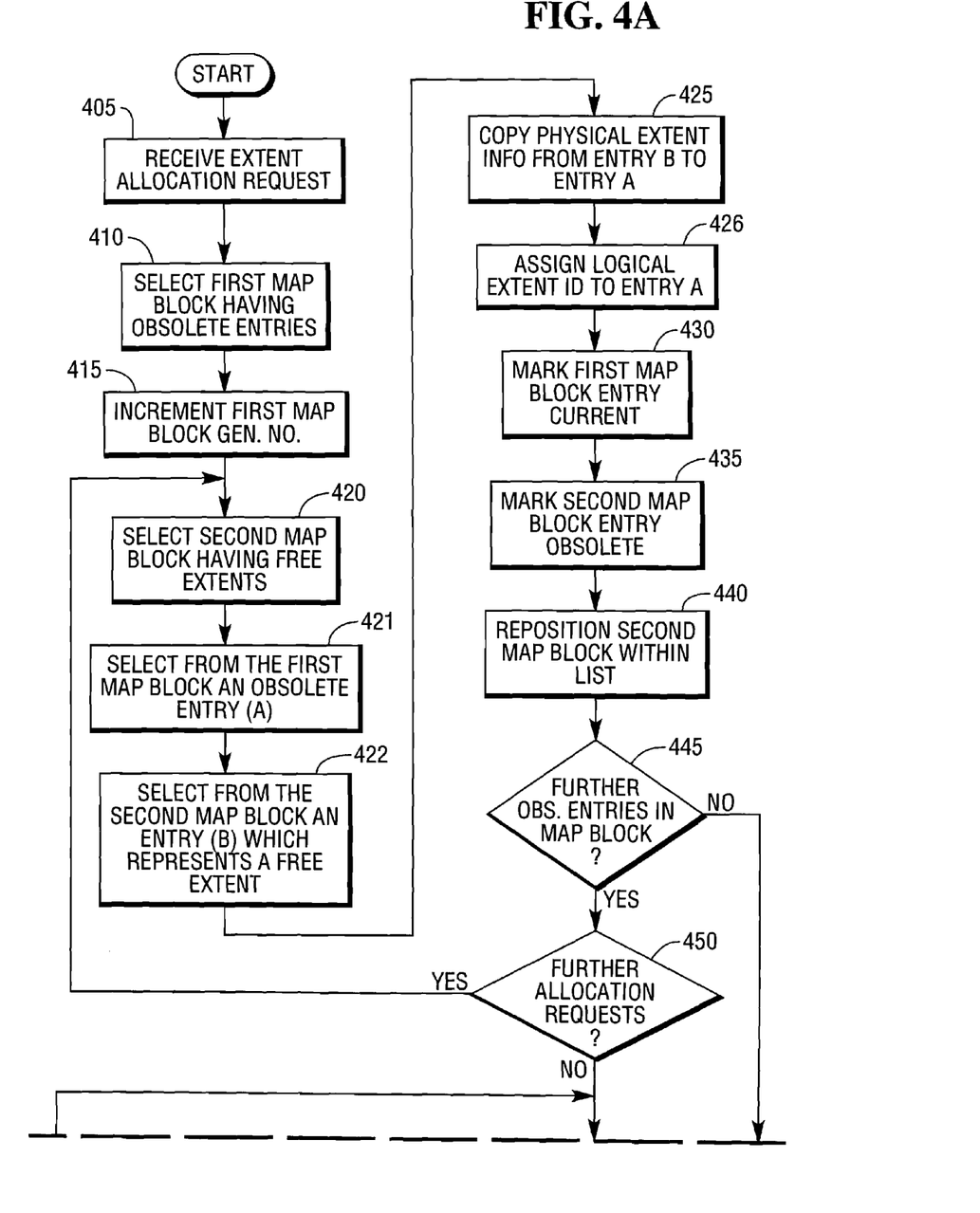
FIG. 4 shows a method for allocating storage space or extents to requesting entities.
Figure 4B:
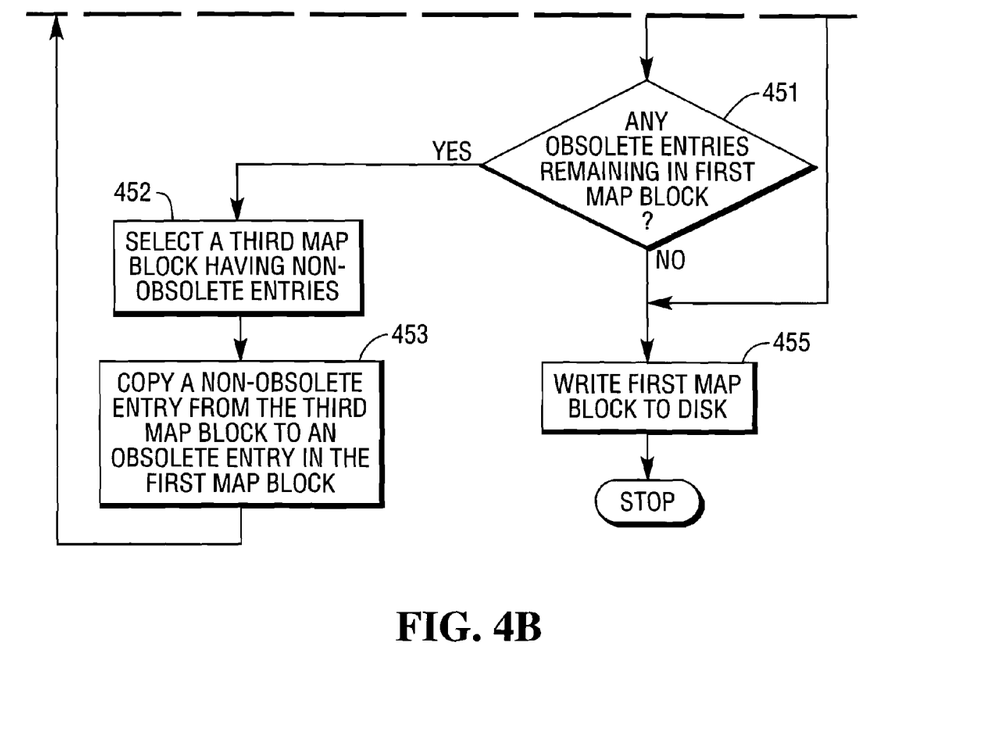

FIG. 4 illustrates a preferred form method for allocating storage space or extents to requesting entities. Requesting entities request allocation of one or more extents. These extent allocation requests are received 405 and are placed in an input queue. It is envisaged that a reasonable number of these allocation requests are de-queued and processed in a batch.

A first map block is selected 410 from a structure such as the ordered list of allocation map 300 in FIG. 3. This first map block has at least one obsolete map entry and preferably all map entries in the first map block are marked as obsolete. If not all map entries are marked as obsolete then the first map block is a map block within the ordered list that has the highest number of obsolete map entries. The first map block is preferably de-queued from the list.

The generation number of the first map block is incremented 415 to signal a new map block entry.

A second map block is then selected 420. This second map block has at least one first map entry that represents a free extent.

Physical extent information is copied 425 from the free map entry in the second map block to the obsolete entry in the first map block. A new logical extent identifier is assigned to the entry in the first map block 426.

The map entry in the first map block is then marked 430 as current and the map block entry in the second map block is marked 435 obsolete.

The first map block now has one fewer map entries marked as obsolete. The second map block now has one more map entry marked as obsolete. The second map block are then repositioned 440 within the ordered list. The first map block remains dequeued.

Where there are further obsolete entries in the first map block 445 and there are additional allocation requests to process 450, the steps 420 to 445 are optionally repeated until there are no further obsolete entries in the first map block.

If there are still obsolete entries in the first map block and there are no additional allocation requests to process 451 a third map block having non obsolete entries is selected 452 and a non obsolete entry is chosen 452 and copied into the first map block 453.

Once all allocation requests have been processed or no obsolete entries remain in the first map block 451 the first map block is written 455 to disk.

Figure 5:
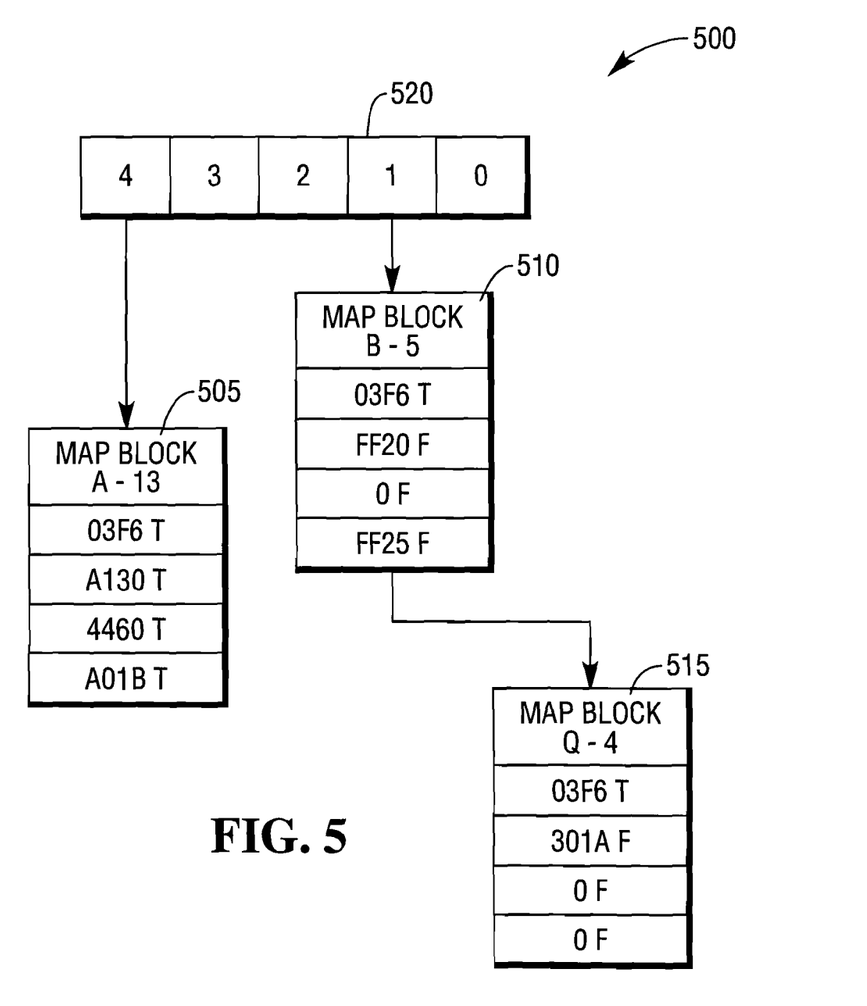
FIGS. 5 to 8 illustrate operation of the techniques described below on an allocation map.

FIG. 5 illustrates operation of the techniques described below on an allocation map 500 having three map blocks, map block A 505, map block B 510 and map block Q 515. Each map block in turn has four map entries. Each map entry is shown as including a logical identifier (eg a 16 bit number shown in hexadecimal between 0 and FFFF) and an obsolete indicator (T or F). The value T here indicates that the map entry is obsolete. The map blocks are stored in ordered list 520. Map block 505 has four obsolete entries so it is stored at the head of the list. Map blocks 510 and 515 each have one obsolete entry.

Figure 6:
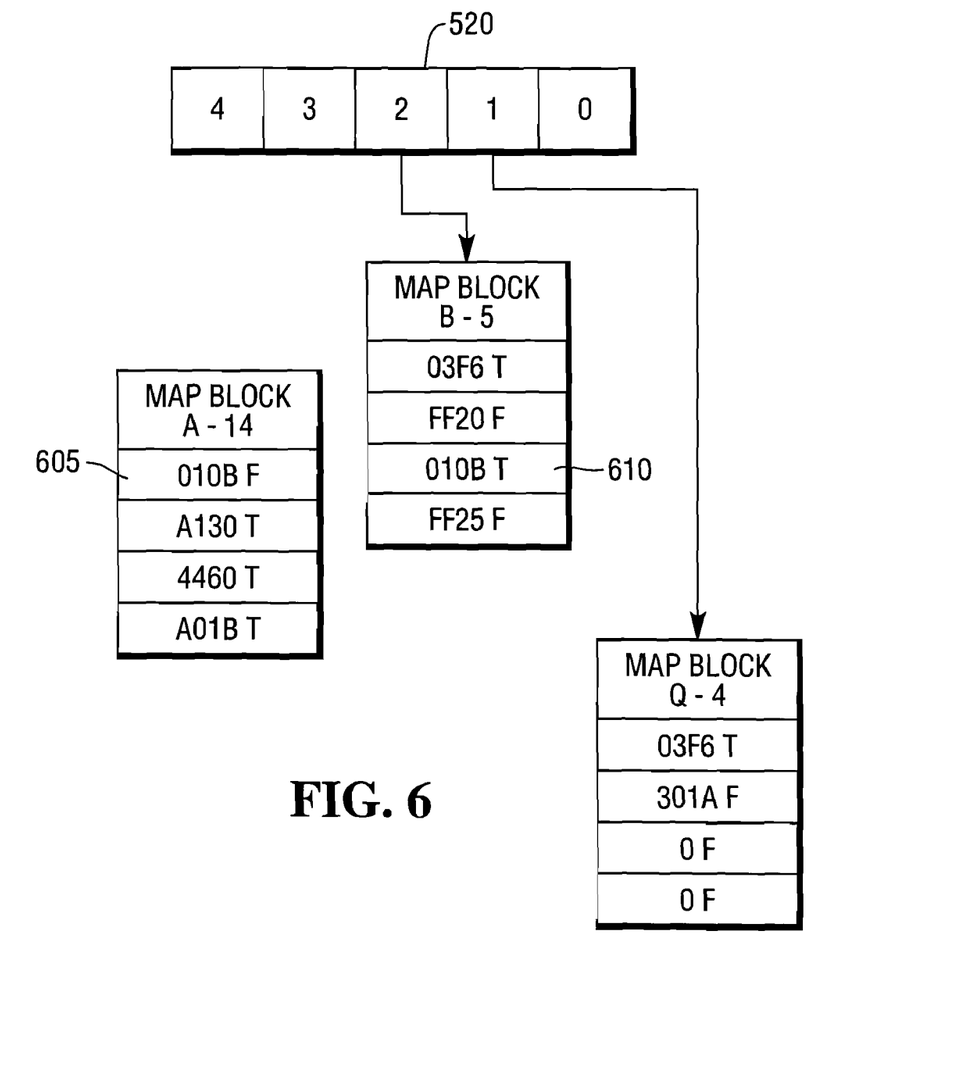

FIG. 6 shows the first iteration in which first map block A is de-queued from the list. The generation number is incremented from 13 to 14. Map block B is identified as a second map block that has a map entry representing a free extent. This is indicated as the third extent in FIG. 5 with a null identifier in map block B. A new logical extent identifier is assigned ("010B") and then copied to map block A indicated at 605. The third entry 610 in map block B is marked as obsolete. Map block B is moved from the position in the list 520 indicating that it has one obsolete entry to a position in the list indicating that it has two obsolete entries. Map block Q remains in the same position in the list as having one obsolete entry.

Figure 7:
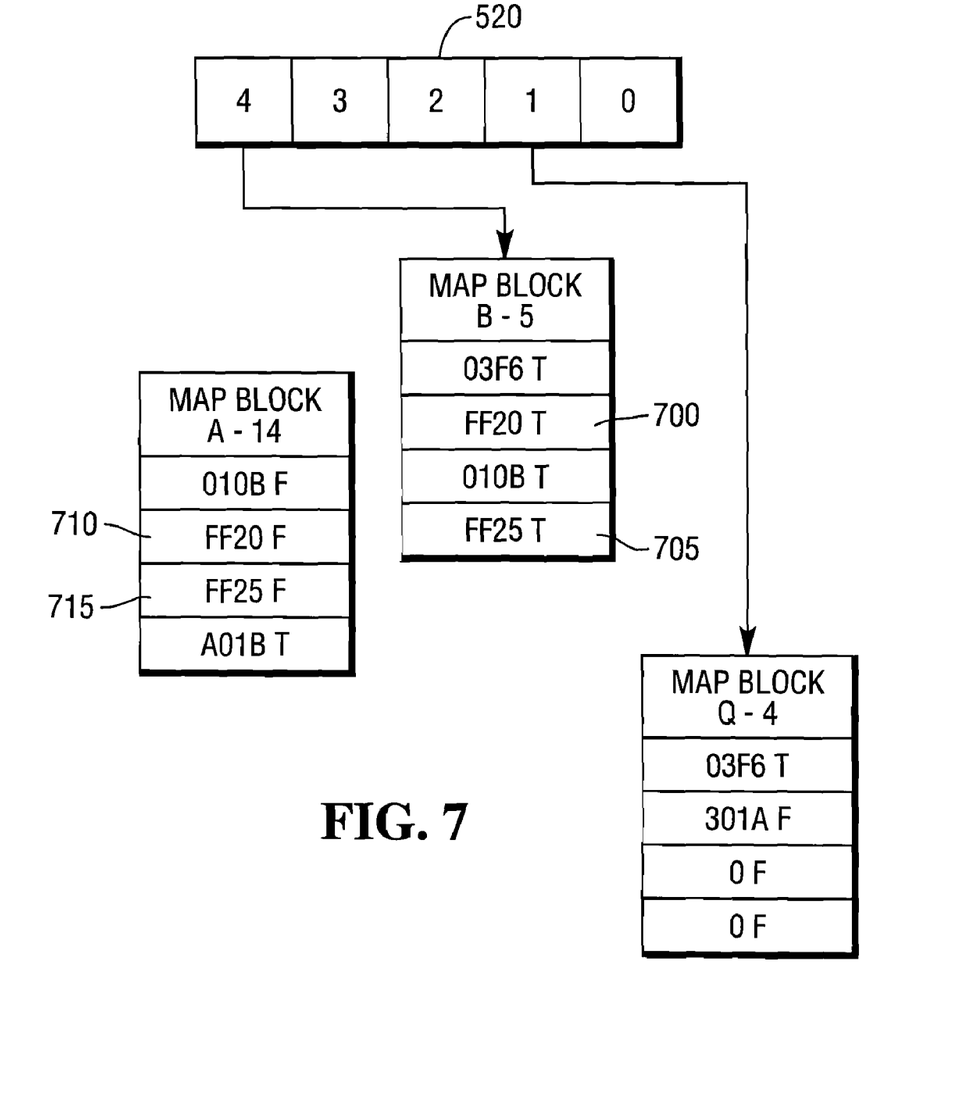

There are three further obsolete entries in map block A. As shown in FIG. 7 the allocation map is searched for further map blocks that have further non-obsolete map entries. Map block B includes map entries indicated as both FF20 shown at 700 and FF25 shown at 705. Both map entries FF20 and FF25 are copied from map block B to map block A resulting in map entries 710 and 715. The entries for FF20 and FF25 are marked as obsolete in map block B and map block B is moved up the list 520 to indicate that all entries in map block B are obsolete.

Figure 8:
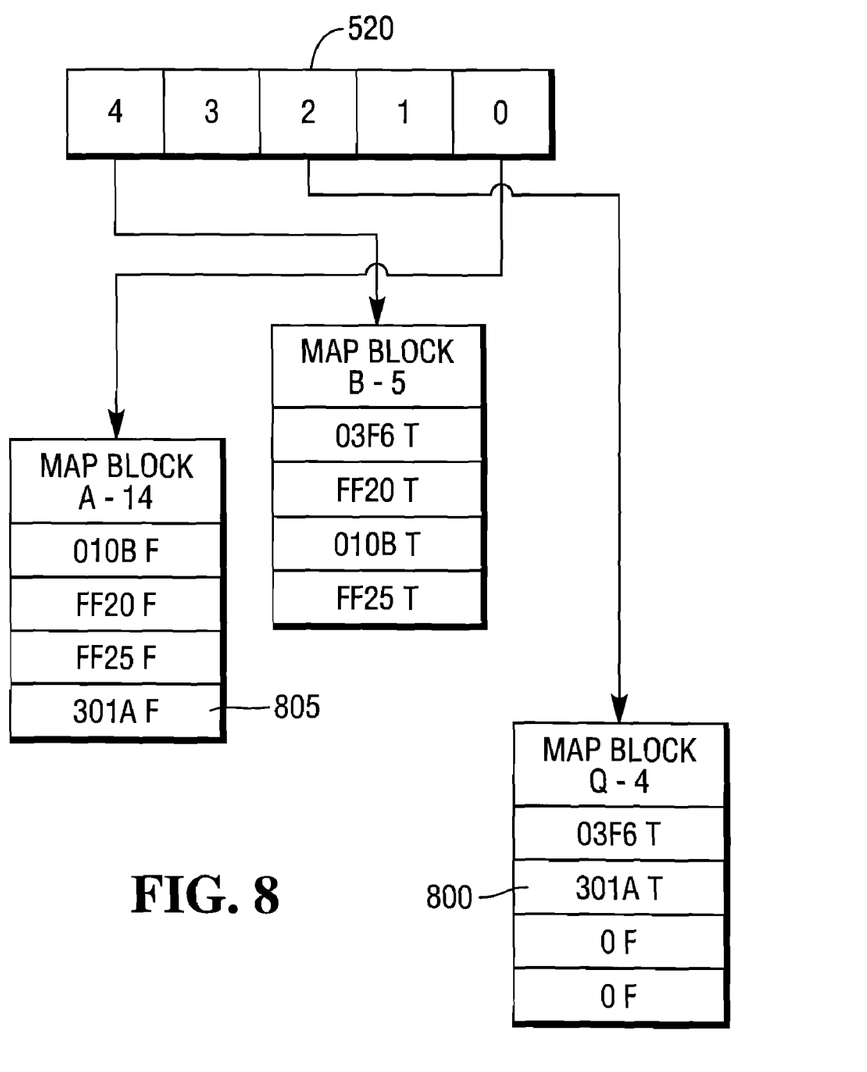

As shown in FIG. 8 the remaining obsolete entry in map block A is replaced with the non-obsolete entry 301A shown at 800 in map block Q resulting in map entry 805. Map entry 800 is marked as obsolete The position of map block Q is moved up the list 520 to indicate that it has two obsolete entries.

The check sum for map block A is then recalculated and map block A is written to disk. Map block A is inserted back into ordered list 520 at a position in the list indicating that it has no obsolete entries.

The number of times that map entries are copied for example from map block B and map block Q to map block A will depend on the number of allocation requests in the queue. The more allocation requests there are, the fewer map entries will be needed to fill up the remainder of map block A. The map entries of map block A will instead be filled by the allocation requests from the queue.

Requests to free an extent are processed like allocation requests except that a null logical extent identifier is inserted into the map entry to indicate that the extent is free.

Any allocation request will generally result in one map entry becoming obsolete and one map entry being assigned a new value and so it is envisaged that there will be sufficient obsolete entries. In one preferred form embodiment of this method, the allocation map includes one or more additional map blocks in which all map entries are marked as obsolete. For reasonable performance, the number of extra map blocks all marked as obsolete should be at least the number of concurrent map I/Os allowed incremented by one.

To increase the likelihood that multiple requests will involve the same map block, in one preferred form free entries are preferred when choosing which entries to copy to fill in the destination map block.

It is envisaged that only a few percent extra map blocks are needed to achieve fewer than one I/O operation per allocation request.

The techniques described above provide several recovery scenarios. In a warm restart recovery scenario, the allocation map as stored in memory is preserved possibly by implementing the allocation map as a memory mapped file. Request allocation resumes as if nothing has happened.

In an I/O failure while writing map block the allocator increments the generation number and tries writing to a different map block if additional spare map blocks are available. If that fails, the allocator responds to the requesting entity with error indication. The allocator in one form also tries more extensive recovery mechanisms such as attempting to read the block to see if the data made it to the disk.

A further recovery scenario occurs through node failure causing an interrupted write. The last block written may or may not have made it to disk or may have made it only partially to disk. There are three possibilities after a restart. These possibilities include none of the data made it to the disk part of the data made it to the disk and all of the data made it to the disk.

Where none of the data has made it to the disk old allocation assignments are still in old map blocks. A prior image of the map is preserved. The requesting entities were not allocated the new extents. The requesting entity must check the assigned extents and re-free the extents if required.

Where only part of the data made it to disk the check sum will not be correct. Old allocation assignments will still be in place as above. Blocks are reinitialized with all obsolete entries.

In the third scenario all of the data made it to disk. The allocator believes that the allocation succeeded. A scan of the map will find a high generation number and obsolete older map entries. The requesting entities may not have received a response to request before the crash and will have to check the assigned extents and re-free if needed.

The techniques described above have the potential to provide less than one I/O operation per extent allocation on a busy system. One I/O per request allocation is expected on a non-busy system. The techniques described above also have the potential to provide allocation map integrity in the presence of interrupted writes with only a minimal amount of extra disk and memory space required.

The text above describes one or more specific embodiments of a broader invention. The invention also is carried out in a variety of alternative embodiments and thus is not limited to those described here. Those other embodiments are also within the scope of the following claims.

We claim:

1. A method of allocating storage space on a storage device to a requesting entity, the storage device including a set of extents, the method comprising:
   maintaining an allocation map in computer memory, the allocation map having a plurality of map blocks, the map blocks each having a plurality of map entries, the map entries including respective logical extent identifiers, physical extent information, and an obsolete flag, where a null logical extent identifier represents a free extent and a non-null extent identifier represents a prior allocated extent, and where the obsolete flag marks a map entry as either current or obsolete;
   receiving an extent allocation request from the requesting entity;
   selecting a first map block having a first map entry marked as obsolete;
   selecting a second map block having a second map entry representing a free extent and not marked as obsolete;
   copying the physical extent information from the second map entry to the first map entry;
   assigning a new logical extent identifier to the first map entry;
   marking the first map entry as current; and
   marking the second map entry as obsolete.

2. The method of claim 1 further comprising selecting the first map block based at least partly on the number of obsolete map entries associated with the first map block.

3. The method of claim 2 further comprising selecting the first map block with the highest number of obsolete map entries.

4. The method of claim 2 further comprising selecting the first map block having a higher number of obsolete map entries than at least one other map block in the allocation map.

5. The method of claim 2 wherein the plurality of map blocks are maintained in a list within the allocation map, the allocation map ordered by the number of obsolete map entries in which map blocks having a higher number of obsolete map entries are closer to the head of the list.

6. The method of claim 5 further comprising selecting the first map block from the head of the list.

7. The method of claim 1 wherein one or more of the map blocks in the allocation map include a numerical generation identifier.

8. The method of claim 7 further comprising the step of incrementing the generation identifier of the first map block.

9. The method of claim 2 further comprising the steps of:
identifying a further map entry marked as obsolete in the first map block;
selecting a further map block having a further map entry not marked as obsolete;
copying the physical extent information from the further map entry in the further map block to the further map entry in the first map block;
copying the logical extent indicator from the further map entry in the further map block to the further map entry in the first map block;
marking the further map entry in the first map block as current; and
marking the further map entry in the further map block as obsolete.

10. The method of claim 9 further comprising selecting the further map block with the highest number of obsolete map entries.

11. The method of claim 9 further comprising selecting the further map block having a higher number of obsolete map entries than at least one other map block in the allocation map.

12. The method of claim 9 further comprising the step of writing the first map block to disk after marking the further map entry in the first map block as current.

13. The method of claim 1 further comprising the step of maintaining within the allocation map at least one map block having all map entries within the map block marked as obsolete.

14. A storage allocation system comprising:
a disk storage device having a set of extents;
a requesting entity configured to request allocation of one of the extents;
an allocation map maintained in computer memory, the allocation map having a plurality of map blocks, the map blocks each having a plurality of map entries, the map entries including respective logical extent identifiers, physical extent information, and obsolete flags, where a null logical extent identifier represents a free extent and a non-null extent identifier represents a prior allocated extent, and where the obsolete flag marks a map entry as either current or obsolete; and
an allocator configured to:
receive an extent allocation request from the requesting entity;
select a first map block having a first map entry marked as obsolete;
select a second map block having a second map entry representing a free extent and not marked as obsolete;
copy the physical extent information from the second map entry to the first map entry;
assign a new logical extent identifier to the first map entry;
mark the first map entry as current; and
mark the second map entry as obsolete.

15. The storage allocation system as claimed in claim 14 wherein the plurality of map blocks are maintained in a list within the allocation map, the allocation map ordered by the number of obsolete map entries in which map blocks having a higher number of obsolete map entries are closer to the head of the list.

16. The storage allocation system as claimed in claim 15 wherein one or more of the map blocks in the allocation map include a numerical generation indicator.

17. The storage allocation system as claimed in claim 14 wherein the allocation map includes at least one map block having all map entries within the map block marked as obsolete.

* * * * *